US012693194B2

(12) United States Patent
Eason

(10) Patent No.: US 12,693,194 B2
(45) Date of Patent: Jul. 28, 2026

(54) SUBSTATION POWER TRANSFORMER MONITORING SYSTEM FOR ENSURING COOLING SYSTEM INTEGRITY BY ISOLATING DAMAGED RADIATOR SECTIONS

(71) Applicant: Anthony E Eason, Chesterfield, SC (US)

(72) Inventor: Anthony E Eason, Chesterfield, SC (US)

( * ) Notice: Subject to any disclaimer, the term of this patent is extended or adjusted under 35 U.S.C. 154(b) by 299 days.

(21) Appl. No.: 18/622,870

(22) Filed: Mar. 30, 2024

(65) Prior Publication Data

US 2025/0305912 A1      Oct. 2, 2025

(51) Int. Cl.
*G01M 99/00*          (2011.01)
(52) U.S. Cl.
CPC ................................. *G01M 99/005* (2013.01)
(58) Field of Classification Search
CPC .................................................. G01M 99/005
See application file for complete search history.

(56) References Cited

U.S. PATENT DOCUMENTS

| | | | | |
|---|---|---|---|---|
| 6,292,340 B1 * | 9/2001 | O'Regan | ................ | H02H 7/261 |
| | | | | 361/115 |
| 6,828,894 B1 * | 12/2004 | Sorger | ................ | H01F 27/2823 |
| | | | | 336/200 |
| 7,317,598 B2 * | 1/2008 | Magnier | ................ | H01F 27/14 |
| | | | | 361/37 |
| 8,712,596 B2 * | 4/2014 | Scott | ................... | H04L 63/1433 |
| | | | | 700/297 |

(Continued)

FOREIGN PATENT DOCUMENTS

| | | |
|---|---|---|
| CN | 10724048 | 9/2018 |
| CN | 219304181 | 9/2018 |

(Continued)

OTHER PUBLICATIONS

Author: PES Solutions Title: PES-104: Sealing Transformer Radiator Fin Leaks Website: http://blog.pes-solutions.com/pes-104-sealing-transformer-radiator-fin-leaks/ Date: Downloaded Page On Oct. 5, 2023 Google Search 1.

(Continued)

*Primary Examiner* — Jamel E Williams
(74) *Attorney, Agent, or Firm* — Russ Weinzimmer & Associates, PC; Russ Weinzimmer

(57)          ABSTRACT

A substation power transformer monitoring system having a transformer monitor that receives oil level signals, nitrogen flow rate signals, 52*b* breaker status signals, and valve actuator position signals, and then executes instructions based on those signals to determine when predefined radiator section isolation conditions are met. When the conditions are met, control signals are sent to valve actuators of the valves of each radiator section to close or open those valves based on the predefined radiator section isolation conditions, or based on remote manual commands, to isolate particular damaged radiator sections. Thus, the system can address terrorism and/or vandalism of a power transformer in a substation. If some radiator fins are shot or otherwise damaged, causing oil to flow out of the cooling system of the transformer, the system can quickly detect and isolate the leak to prevent further damage to the transformer, while also preventing a larger oil spill.

8 Claims, 6 Drawing Sheets

(56)  References Cited

U.S. PATENT DOCUMENTS

| | | | | |
|---|---|---|---|---|
| 8,878,396 | B2 * | 11/2014 | Faxvog | H02H 3/52 |
| | | | | 361/627 |
| 8,893,216 | B2 * | 11/2014 | Yadav | H04L 63/1441 |
| | | | | 726/13 |
| 9,136,692 | B2 * | 9/2015 | O'Regan | H02H 7/28 |
| 9,442,150 | B2 * | 9/2016 | Jain | G01R 31/62 |
| 9,897,665 | B2 * | 2/2018 | Taft | H04L 41/0681 |
| 10,145,830 | B2 * | 12/2018 | Fenton | G01K 13/00 |
| 10,431,375 | B2 * | 10/2019 | Frimpong | H01F 27/402 |
| 10,543,511 | B2 * | 1/2020 | Frimpong | G01S 11/14 |
| 10,840,677 | B2 * | 11/2020 | Leber | H01F 27/02 |
| 2010/0296205 | A1 * | 11/2010 | Wakchaure | H01F 27/14 |
| | | | | 361/36 |

FOREIGN PATENT DOCUMENTS

| | | |
|---|---|---|
| CN | 218414194 | 1/2023 |
| DE | 102011051789 | 1/2013 |
| EP | 3065245 | 1/2018 |

OTHER PUBLICATIONS

Author: EDIS Osmanbasic Title: Exploring Power Transformer Protection for Power Systems: Failure Types and Differential Protection Website: https://www.allaboutcircuits.com/technical-articles/power-transformer-protection-power-systems-failure-differential-protection/ Date: Downloaded Page On: Oct. 5, 2023.

* cited by examiner

Obtain # of Radiator sections                    200

Obtain isolation valve sizes & dimensions        202

Select valve actuator & mounting bracket         204

Enter # sections & actuator timing supervision into monitor    206

SUBSTATION POWER TRANSFORMER MONITORING SYSTEM FOR ENSURING COOLING SYSTEM INTEGRITY BY ISOLATING DAMAGED RADIATOR SECTIONS

FIELD OF THE INVENTION

This invention relates generally to power transformer radiator cooling in substations, and more particularly to systems and methods for monitoring and automated control of transformer cooling systems.

BACKGROUND OF THE INVENTION

Electric power utility delivery systems include equipment such as transformers, generators, and power lines, and the like, to provide electrical energy from a source to various loads. These power delivery systems utilize step-up and step-down power transformers to modify the voltages as required for power delivery. Often, these station power transformers are oil-filled and require some form of external cooling. To facilitate this external cooling process, radiator sections consisting of rows of cooling fins are attached. Oil flows naturally through these radiator sections, or the oil can be forced by motor operated pumps. The radiator sections can also be cooled by forced air from attached fans, or can be cooled by natural air flow. These radiator sections are often shipped unattached from the main transformer tank and assembled at the final installation. Radiator section isolation valves are present on most of these transformers to facilitate easy installation and removal of these radiator sections, as needed.

Power transformers often include an internal oil level device that identifies a low oil level condition. These devices can identify one or more thresholds as oil levels drop in a transformer, the first threshold triggering an alarm, and the second lower threshold triggering electrical isolation of the transformer. Extremely low oil levels in these power transformers can have catastrophic results if left unchecked.

There have been a significant number of electrical outages in the news due to terrorism, vandalism, sabotage, and guerrilla attacks, particularly involving vandalized or sabotaged or damaged radiator sections on a substation transformer, such as by shooting the radiator sections. Thus, recent events have shown that these radiator sections can be targeted by vandals and terrorists due to the inherent vulnerability of these radiator sections to damage. These radiator sections can be shot or drilled, and/or oil drain valves can be opened without notice, all of which can result in an uncontrolled oil leak, which can lead to more serious damage.

Not all of these methods of terrorism, vandalism, sabotage, and guerrilla attacks can be detected by gunshot detection technology, nor can they be reliably detected by vibration sensors on the transformers. If the available nitrogen (N2) flow is adequate as compared to the leak/orifice size, a drop in oil pressure will not be detected, and cannot therefore be reliably used as a trigger to take corrective action.

SUMMARY OF THE INVENTION

An electric actuator is attached to an existing transformer radiator isolation valve, or an electric actuator-controlled valve is installed between the radiator sections and the main substation transformer tank. These electric actuators close automatically and sequentially as a group based on: (1) a combination of nitrogen flow rate greater than a nitrogen flow rate threshold for a duration longer than a nitrogen flow rate duration threshold, and a low oil level signal, or (2) a time duration less than predetermined value for the oil level to drop from "low" level to "low-low" level within the transformer due to an external leak. A smart controller monitors multiple oil level contacts as well as nitrogen flow rates to make an automated decision based thereupon, and the smart controller begins to cause each radiator section to close sequentially until all sections are closed. This can be supervised by "high side" breaker contacts to ensure that the transformer does not overheat by isolating all radiator sections. In addition, a high nitrogen flow rate can alert a dispatcher to monitor station cameras to determine whether a specific radiator section has a failure that requires remote isolation of the radiator section from the other radiator sections. The "high side" breaker contacts, as well as an "arming" contact connected in parallel to the "high side" breaker contacts, can control both automated and remote operation to prevent cyber criminals from initiating this isolation process with an intent to damage the substation transformer.

An important use of this invention is to proactively address terrorism and/or vandalism of a power transformer in a substation. If one or more of the radiator fins are shot or otherwise damaged, thereby causing oil to flow out of the cooling system of the transformer, the transformer monitoring system of the invention will quickly detect and isolate the leak to prevent further damage to the transformer, while also preventing a larger oil spill.

The transformer monitoring system of the invention automates the isolation of damaged or compromised radiator sections upon the identification of an oil leak that results in high nitrogen (N2) flow coupled with a drop in oil level until suitable resources can arrive on scene. The method and apparatus of the invention is secure and reliable, because it does not trigger based upon just a simple nitrogen (N2) leak of any rate, if no related reduction in oil level occurs.

Further, the invention time stamps an initial 'lo' oil level signal and look for a related 'lo-lo' oil level within a predetermined period to identify a relatively fast oil leak. However, since both of these contacts are often located in the same enclosure, they are susceptible to water intrusion/ rain, which can inadvertently trigger an unnecessary operation of this system if both contacts triggered within the specified timeframe, without regard for the duration of nitrogen (N2) flow.

The invention provides an apparatus and method for automatically detecting failure of a single radiator section, and then isolating the single radiator section, or a set of radiator sections, cooperative with a power transformer. An electric actuator can be attached to an existing isolation valve, or an electric actuator and valve combination can be installed between the radiator and the main transformer tank. This actuator maintains the associated valve in a normally open position to allow the normal flow of oil, either forced or natural, through the associated radiators from the main tank. When called upon to close, the actuator will isolate the damaged radiator sections from the main tank of the transformer.

The actuator can be controlled by a programmable device located at or near the transformer, or remote from the location of the transformer. This programmable device can respond to falling oil levels within the transformer tank in a programmed manner so as to isolate the radiator sections from the main tank in an attempt to stop the falling oil level within the tank. This is accomplished by providing single or multiple sensor inputs, including oil level indication to the programmable device.

The use of timers associated with multiple level indicators/inputs can be used to determine the severity of the leak, and can then be used to determine whether to isolate the radiator section from the main tank. The amount of oil leaking can be determined by comparing time stamps associated with each oil level trigger to help decide whether to isolate one or more of the valves.

This electronic programmable device can also monitor an upstream protective device (e.g., a breaker) to verify that it has electrically isolated the power transformer before attempting to isolate particular radiator sections from the main tank.

The electronic programmable device can provide automation, or can enable an operator to manually sequence the operation of the valves to limit demand on a substation battery, or to limit demand on the conductors serving this load.

Thus, the invention can automatically isolate vandalized or sabotaged or damaged radiator section of a cooling system of a substation transformer.

Existing valves can be used to retrofit existing cooling systems of substation transformers to employ the apparatus and methods of the invention, or the invention can be incorporated during manufacturing of a substation transformer having a cooling system with a plurality of radiators.

An electric actuator can be attached to at least one existing isolation valve, or an electric actuator and valve combination can be installed between radiator sections and the main tank of the substation transformer. This actuator closes in response to detection or measurement of a falling oil level within the transformer tank due to an external leak, or in response to remote commands from an operator.

A transformer monitor, or Station RTU, is connected to sensors that monitor dropping oil levels, increased nitrogen flow rates as a result of falling oil level, and circuit breaker statuses. The transformer monitor automatically isolates all of the radiator sections upon confirmation of nitrogen flow rates exceeding a previously established threshold in response to dropping oil levels, or upon confirmation of the speed of a drop in oil level, or a combination of both. The monitoring system can include a human to machine interface (HMI) that allows an operator to remotely monitor and operate this system instead of the automated function.

Cameras within the substation can also provide inputs for human to machine interface (HMI) monitoring and operation such that a human can remotely isolate a single radiator section when visual indications confirm that a particular section contains a leak, such as when triggered by a high nitrogen (N2) flow alarm. A transformer de-rating chart, previously established, can quickly allow a human operator to remove and/or transfer load from that transformer to prevent overloading following the isolation of one or more radiator sections. If forced airflow is available, it could be automatically or remotely enabled to assist with offsetting the loss of one or more radiator sections to increase the available load capabilities of the transformer during this period.

Additional features include: verification that all valves have closed; verification of all valves open; an unidentified arming contact for DC power to the closing circuitry elsewhere within the station that can thwart a would-be cyber terrorist from operating these valves during normal transformer operation; sequenced operation of valves to prevent overwhelming the station DC system; user selectable value that easily defines the number of radiator sections to include in the sequence; user selectable time delay that can coordinate with specific valve actuators selected for this use case; user selectable low oil to low-low oil time interval with integrated secure operation design to mitigate false operation due to water intrusion of these contacts; ability to include remote signals from other station devices to trigger valve responses; and GPS clocked time stamps for each action recorded and/or taken by the transformer monitor.

This system is also easily transferrable to an alternate station transformer at transformer 'end of life' EOL. The system can allow for the bottom actuators to be installed on the isolation valves first, followed by the installation of the top actuators when a brief outage can be scheduled (to allow access to top of transformer for installation) at some later date.

A general aspect of the invention is a substation power transformer monitoring system. The substation power transformer monitoring system includes: a plurality of oil level indicators configured to provide oil level signals, including lo and lo lo; a plurality of nitrogen flow rate indicators configured to provide nitrogen flow rate signals; a plurality of 52$b$ breaker status indicators configured to provide 52$b$ breaker status signals; a plurality of valve actuator position indicators configured to provide valve actuator position signals; a plurality of valve actuators for controlling a valve that controls oil flow out of a radiator cooling section, each valve actuator configured to respond to control signals that control valve opening and valve closure; a transformer monitor having: a memory; a processor operatively coupled to the memory; and an input structure operatively coupled to the processor, the input structure configured to receive the oil level signals, the nitrogen flow rate signals, the 52$b$ breaker status signals, and the valve actuator position signals, the processor configured to execute instructions stored in the memory using the oil level signals, the nitrogen flow rate signals, the 52$b$ breaker status signals, and the valve actuator position signals to perform processor operations including: using the oil level signals, the nitrogen flow rate signals, the 52$b$ breaker status signals, and the valve actuator position signals to determine when predefined radiator section isolation conditions are met; and sending control signals to the valve actuators to close or open the valves based on the predefined radiator section isolation conditions, or based on remote manual commands so as to isolate damaged radiator sections.

In some embodiments, the processor operations further include: immediately initiating local and remote alarms in response to the predefined radiator section isolation conditions being met, thereby locally and remotely indicating particular damaged radiator sections that require isolation.

In some embodiments, the substation power transformer monitoring system further includes: a second monitor or I/O extension unit operatively coupled to the transformer monitor, the second monitor or I/O extension unit configured to allow additional radiator sections to be controlled, and whose operation is directed by the monitoring system.

In some embodiments, the substation power transformer monitoring system further includes: a communication port configured to couple to a Station Remote Terminal Unit for data transfer, and configured to allow external control.

In some embodiments, the predefined radiator section isolation conditions include: high nitrogen flow rate; low oil level; and an open status of the 52$b$ breaker.

In some embodiments, the predefined radiator section isolation conditions include: dropping oil level from lo to lo lo lo occurring within a predetermined time period; and an open status of the 52b breaker.

In some embodiments, the predefined radiator section isolation conditions include: high nitrogen flow rate; falling oil level from lo to lo lo; and an open status of the 52b breaker.

In some embodiments, the substation power transformer monitoring system further includes: time-stamping each performed operation and retaining each performed operation with a time-stamp for future reference.

BRIEF DESCRIPTION OF THE DRAWINGS

Many additional features and advantages will become apparent to those skilled in the art upon reading the following description, when considered in conjunction with the accompanying drawings, wherein.

DETAILED DESCRIPTION

Figure 1:
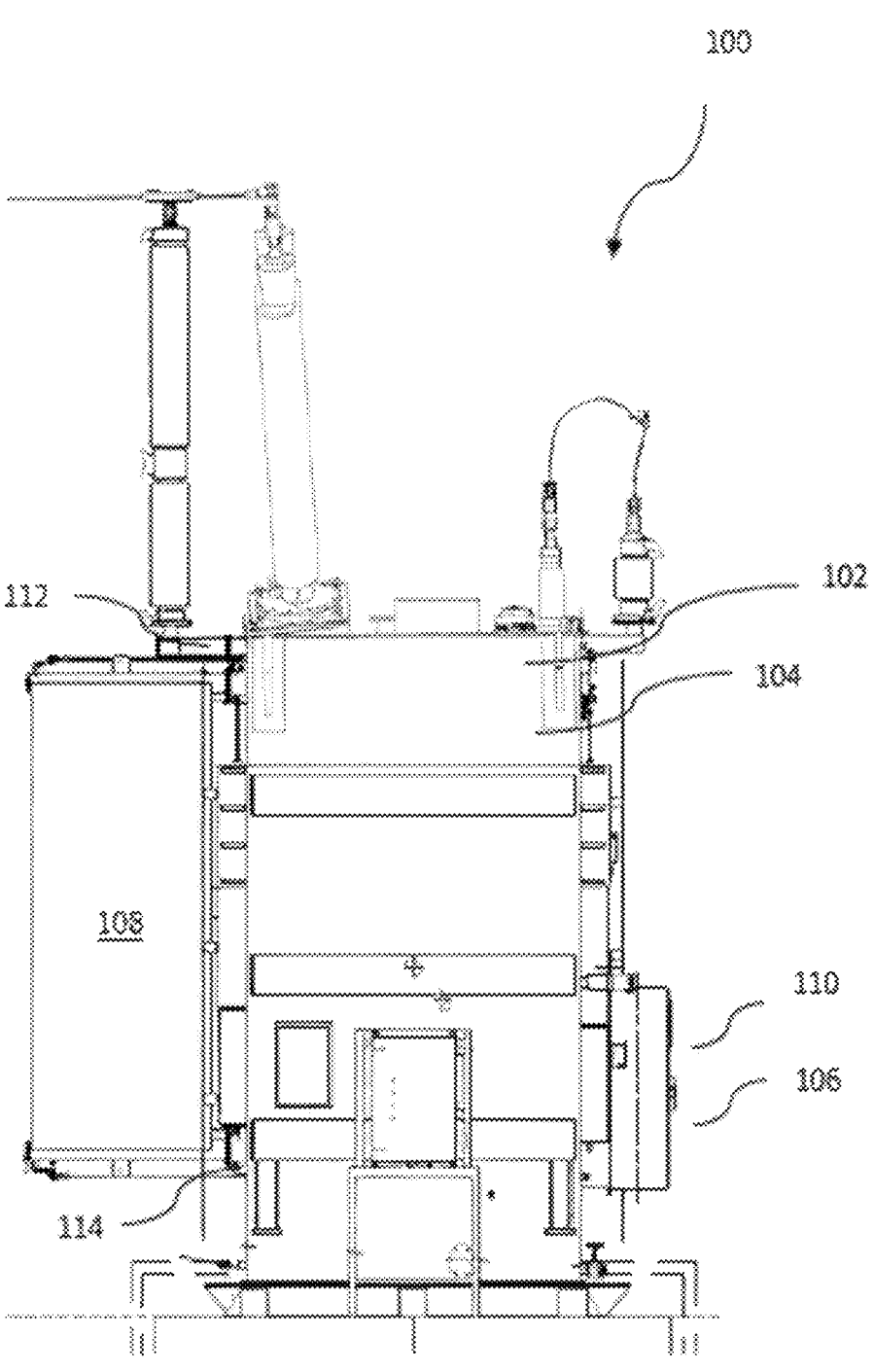
FIG. 1 is a side view of a substation power transformer in use with the invention, showing the top valves, the bottom valves, and the radiator sections of the cooling system of the substation power transformer, also showing a nitrogen flow rate meter, a low oil level sensor, and a low low oil level sensor.

Referring to FIG. 1, a substation power transformer 100 is shown for use with this embodiment of the transformer monitoring system of the invention. The transformer monitoring system includes a variety of sensors to provide information about the status of the cooling system of the station power transformer 100, the sensors including: a low oil level sensor 102, a low-low oil level sensor 104, and a nitrogen flow meter 106, for example.

The transformer monitoring system receives input from the low oil level sensor 102, the low-low oil level sensor 104, and the nitrogen flow meter 106, each being in fluid communication with specific radiator sections 108 of the station power transformer 100.

Figure 3:
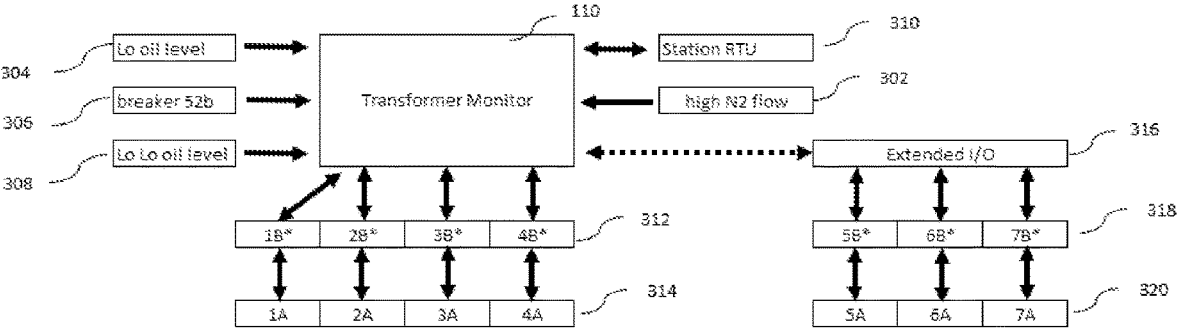
FIG. 3 is a data flow diagram showing the inputs, outputs, and optional connections to the Transformer Monitor for controlling up to seven radiator sections of the cooling system of the substation power transformer of FIG. 1, both locally and remotely.
Figure 4:
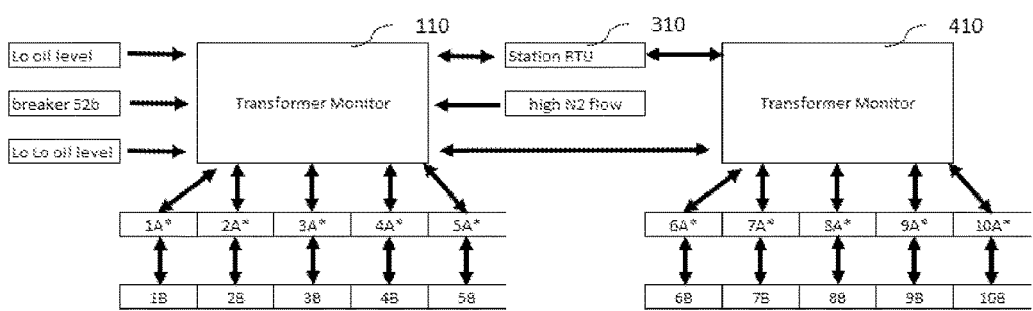
FIG. 4 is a data flow diagram showing another embodiment including a master Transformer Monitor cooperating with a second Transformer Monitor for controlling up to fourteen radiator sections (only ten radiator sections shown).
Figure 5:
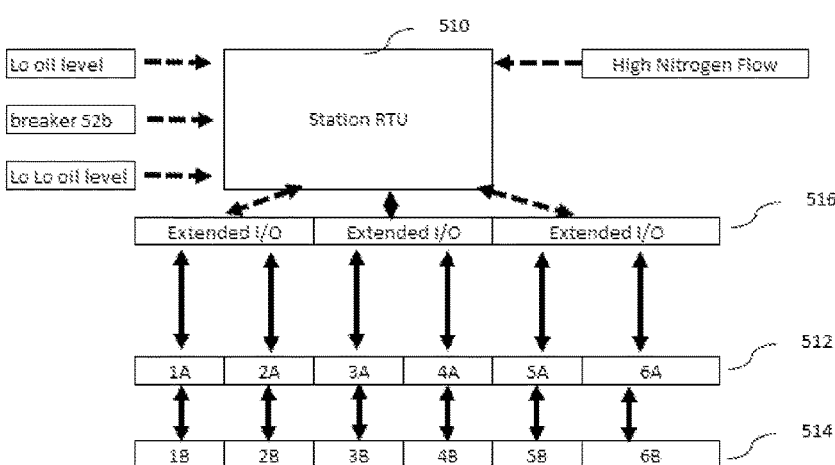
FIG. 5 is a data flow diagram showing the Station RTU (Remote Terminal Unit) as the Transformer Monitor, gathering data from other devices within the station, as well as controlling and getting status data back from the valve actuators, the Station RTU directly controlling automation valves with I/O extension units via several different communication protocol options.

A transformer monitor 110 or 410 as shown in FIGS. 3 and 4 (or a Station RTU (remote terminal unit) 510 as shown in FIG. 5) is mounted on or near the substation transformer 100.

Figure 2:
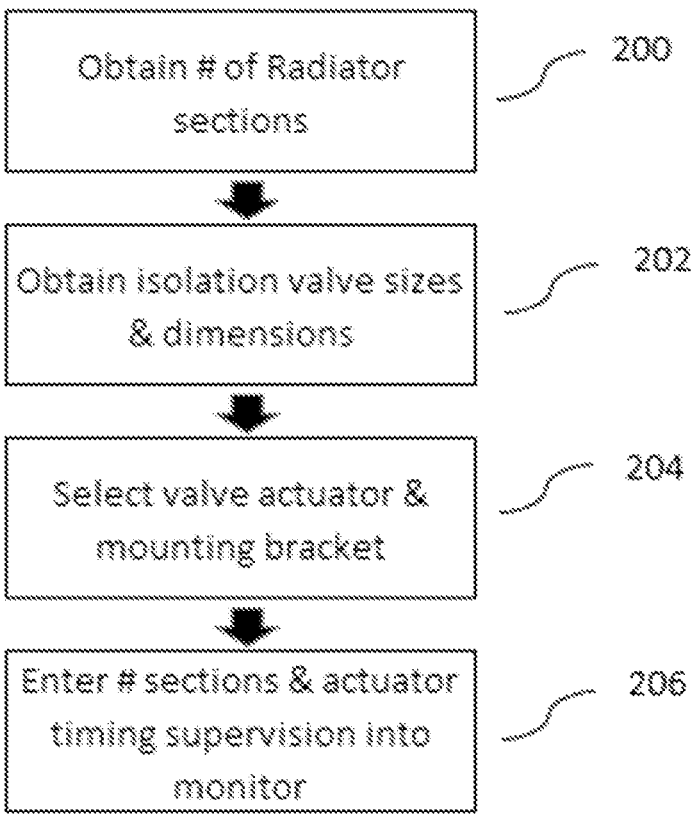
FIG. 2 is a process flow diagram showing a pre-installation to-do list needed to install the apparatus and practice the method of the invention.

Referring to FIG. 2, to implement this embodiment of the transformer monitoring system of the invention, the substati' [on owner must obtain 200 the number of radiator sections. Then, the substation owner must obtain 202 the sizes and dimensions of the isolation valves.

Next, the owner must select 204 the valve actuator and mounting brackets that will be used. A valve actuator mounting bracket may vary slightly from one transformer manufacturer to the next, depending on the existing valve type and dimensions. Using these existing isolation valves is much less intrusive than attempting to add additional valves, or otherwise modify the existing transformer physical design, and does not require an extended outage to install.

The valve actuator mounting bracket can be secured in multiple ways, such as leveraging existing excess bolt lengths on flange connections along with "U" bolts which can clamp around the main oil header pipe. Careful replacement of flange bolts with longer bolts could also aid in this choice for mounting. This valve actuator mounting bracket can be adjusted to allow the valve stem to fully seat within the valve actuator coupling. Retaining the existing mechanical valve travel limiters may be desired. Coupling the actuator directly to the valve stem is the solution for most applications, while some may require conversion from square to round valve stems (local metal fabricators can assist).

Then, the owner must enter 206 the number of radiator sections and actuator timing supervision parameters (e.g., enter 18 seconds for an actuator having a n=13 second travel time, which generally is n+5 seconds) into a logic file executed by the processor 600 of the transformer monitor 110. Further, the substation owner must enter the isolation valve sizes and dimensions into the logic file used by the processor 600 within the transformer monitor 110.

Also in step 200, the substation owner must identify the specific radiator sections 112, 114 of FIG. 1 so the proper valve actuators 312, 314 of FIG. 3 can be selected 204. Then, the timers 206 within the logic file used by the processor 600 can be set or updated by adding a 5 second delay (for example) to the open/close times associated with each valve actuator 312, 314 of FIG. 3.

With reference to FIG. 3, the substation owner will determine whether they wish to install only the bottom valve actuators 314, or both the top valve actuators 312 and the bottom valve actuators 314, so that this information can be entered into the logic file used by the processor 600.

Figure 7A:
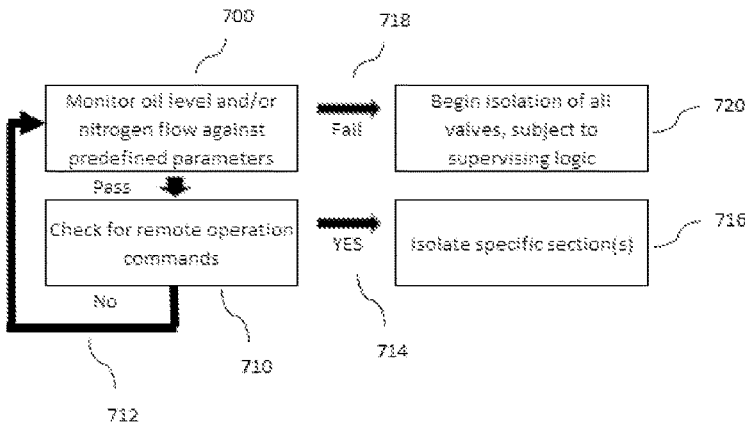
FIG. 7A is a top-level process flow showing how monitoring oil levels and/or nitrogen flow leads to isolation of some or all radiator sections.

Referring to FIG. 7A, to monitor 700 the oil levels and/or nitrogen flow, the transformer monitor 110 compares the oil levels 304, 308 and/or nitrogen flow 302 with respective predefined thresholds. The oil levels 304, 308 and/or nitrogen flow 302 are obtained from the low oil level sensor 102, the low-low oil level sensor 104, and the nitrogen flow meter 106, respectively.

If the oil levels 304, 308 and/or the nitrogen flow rate 302 compare favorably with predefined thresholds, then the oil levels 304, 308 and/or nitrogen flow rate 302 PASS.

Then, the transformer monitor 110 checks 710 for any remote isolation commands. If there are no remote isolation commands, then control returns 712 to step 700. If the remote isolation commands require isolation 714 of specific radiator sections, then those specific radiator sections will be isolated 716.

Figure 7B:
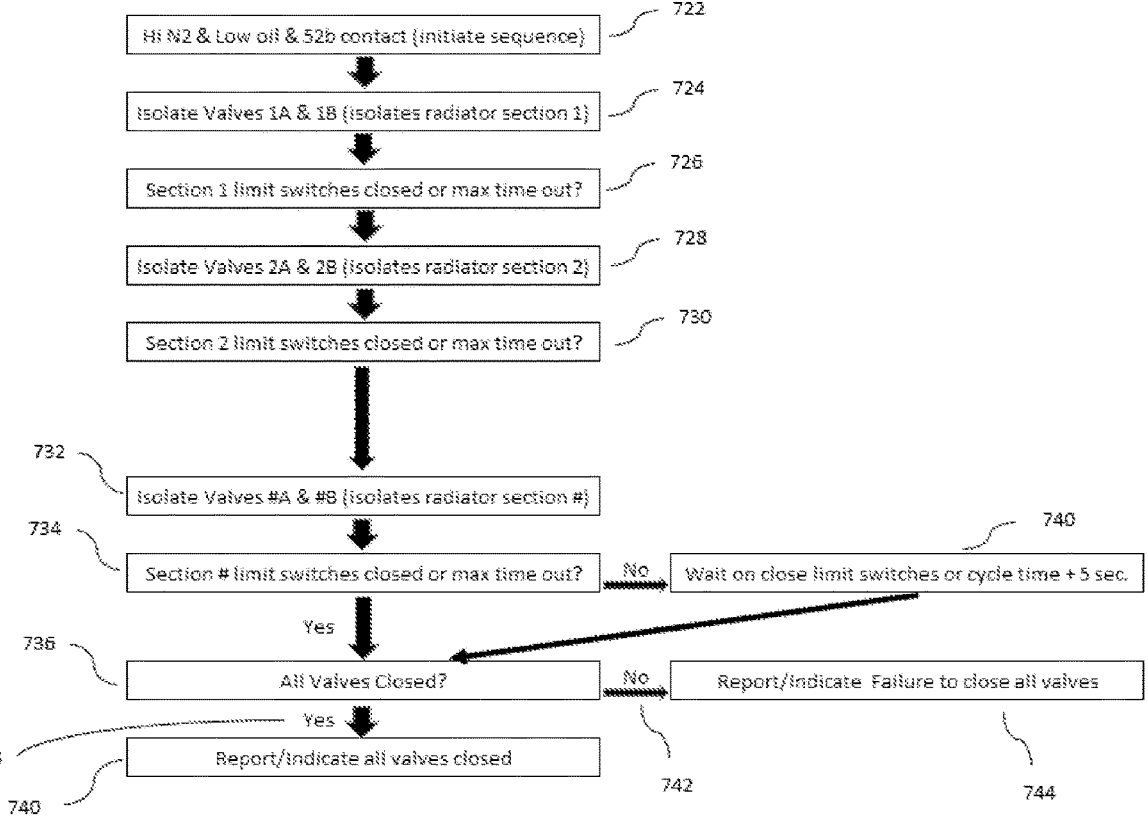
FIG. 7B is a detailed process flow diagram showing an example of a sequence of radiator section isolation in response to changing oil levels and/or nitrogen flow.

If the oil levels 304, 308 and/or nitrogen flow rate 302 do not compare favorably with the predefined thresholds, then the oil levels 304, 308 and/or nitrogen flow rate 302 FAIL 718, and the transformer monitoring system 110 begins isolation 720 of all radiator sections subject to supervising logic, as set forth in FIG. 7B.

Referring again to FIG. 3, the transformer monitor 110 communicates command data to the top valve actuators 312 and to the bottom valve actuators 314, and receives sensor data from the top valve actuators 312 and from the bottom valve actuators 314.

The transformer monitor 110 also receives data from the high N2 flow sensors 302, the Lo oil level sensors 304, the breaker 52b sensors 306, and the Lo Lo oil level sensors 308. Breaker 52b sensor 306 indicates whether the transformer 100 has been shut down, i.e., whether a breaker is open, an open breaker being signified by the breaker 52b sensor having the logic value TRUE.

The transformer monitor 110 also communicates data with the Station RTU 310. All actions taken by the transformer monitor 110 can be communicated to the Station RTU 310 for record retention and/or remote status communication to a system operator. The Station RTU 310 can initiate a local horn and flashing light immediately upon identification of the damage, if desired by the station owner. Additionally, the Station RTU 310 can receive a remote command from a system operator, and then trigger the transformer monitor 110 to take actions, such as isolating one radiator section.

The transformer monitor 110 also communicates with an extended I/O device 316 that controls an additional plurality of top valve actuators 318 and to the bottom valve actuators 320.

With the available extended I/O (inputs and outputs) 316 in service, the transformer monitor 110 is capable of operating an additional three individual radiator sections controlled by top and bottom valves 318, 320. Additional transformer monitors 410 can be integrated to add seven (only five are shown) additional individual radiator sections per additional transformer monitor 410. Conversely, the owner may elect to perform the processing function 600 within the station RTU 510, or the like, which allows for a higher volume of extended I/O 516 to be added.

With reference to FIG. 4, the transformer monitor 110 can interact with a second transformer monitor 410, the transformer monitor 110 acting as a master transformer monitor cooperating with the second Transformer Monitor 410 for controlling an additional plurality of radiator sections (only ten radiator sections are shown in FIG. 4, but more can be controlled, e.g., fourteen or more).

Referring to FIG. 5, a Station RTU 510 can act as a Transformer Monitor, directly monitoring and controlling a plurality of top valve actuators 512 and a plurality of bottom valve actuators 514 via a plurality of Extended I/O devices 516. The Station RTU 510 gathers data from other devices within the station, as well as controls and obtains status data back from the valve actuators, the Station RTU directly controlling valve actuators using I/O extension units.

Figure 6:
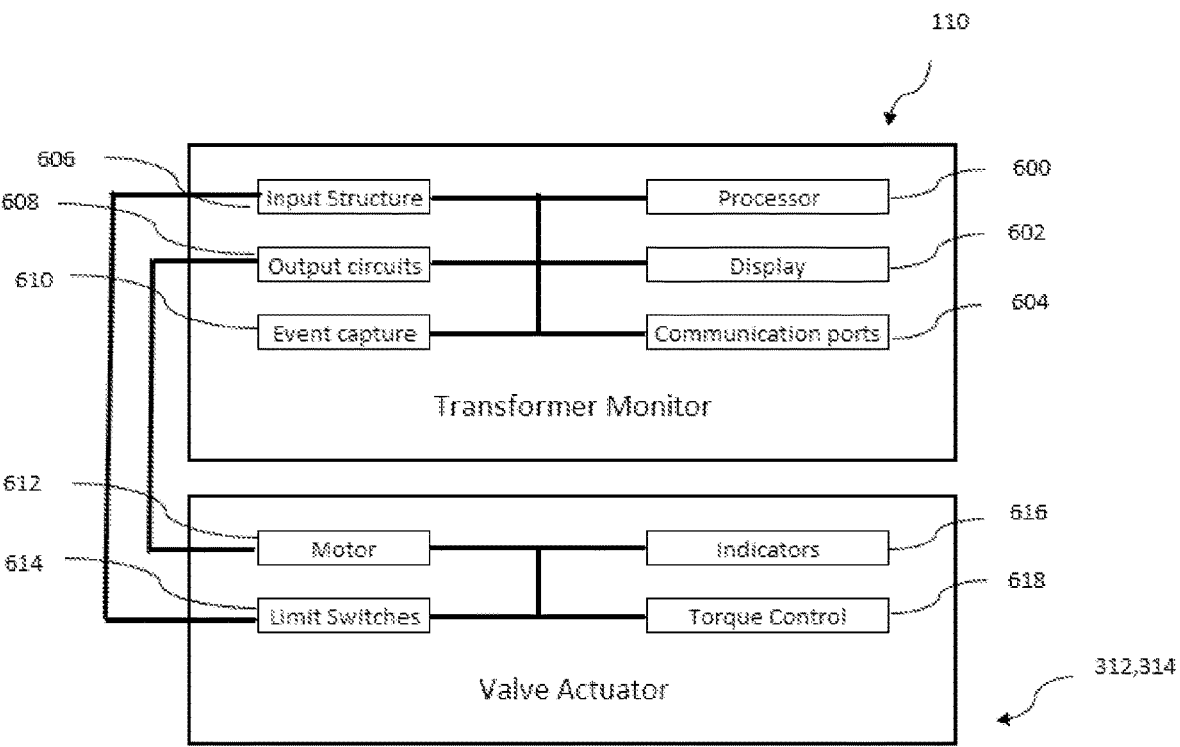
FIG. 6 is a block diagram showing some top-level internal components of the Transformer Monitors of FIGS. 3 and 4, and the Station RTU of FIG. 5, also showing how the top-level internal components of the Transformer Monitors of FIGS. 3, 4, and 5 communicate with top-level components of each of the top and bottom Valve Actuators of FIGS. 3, 4, and 5.

With reference to FIG. 6, top-level internal components of the Transformer Monitors 110, 410, and 510 of FIGS. 3, 4, and 5 are shown. The Transformer Monitors 110, 410, and 510 each have a processor 600, a display 602, communication ports 604, an input structure 606, an output structure 608, and an event capture module 610, each of the components being able to communicate with the other components via a communication bus.

FIG. 6 also shows the top-level components of a Valve Actuator 312, 314, for example. The Valve Actuators 312, 314 each have a motor 612, limit switches 614, indicators 616, and a torque control module 618. Each of the components can communicate with the other components via a communication bus. Further, the motor of the Valve Actuator 312, 314 is in communication with the output circuits 608 of the transformer monitor 110, and the limit switches 614 are in communication with the input structure 606 of the transformer monitor 110.

Referring again to FIG. 7A, if the oil levels 304, 308 and/or nitrogen flow rate 302 do not compare favorably with the predefined thresholds, then the oil levels 304, 308 and/or nitrogen flow rate 302 FAIL 718, and the transformer monitoring system 110 begins isolation 720 of all radiator sections subject to supervising logic, as set forth in FIG. 7B.

Figure 8:
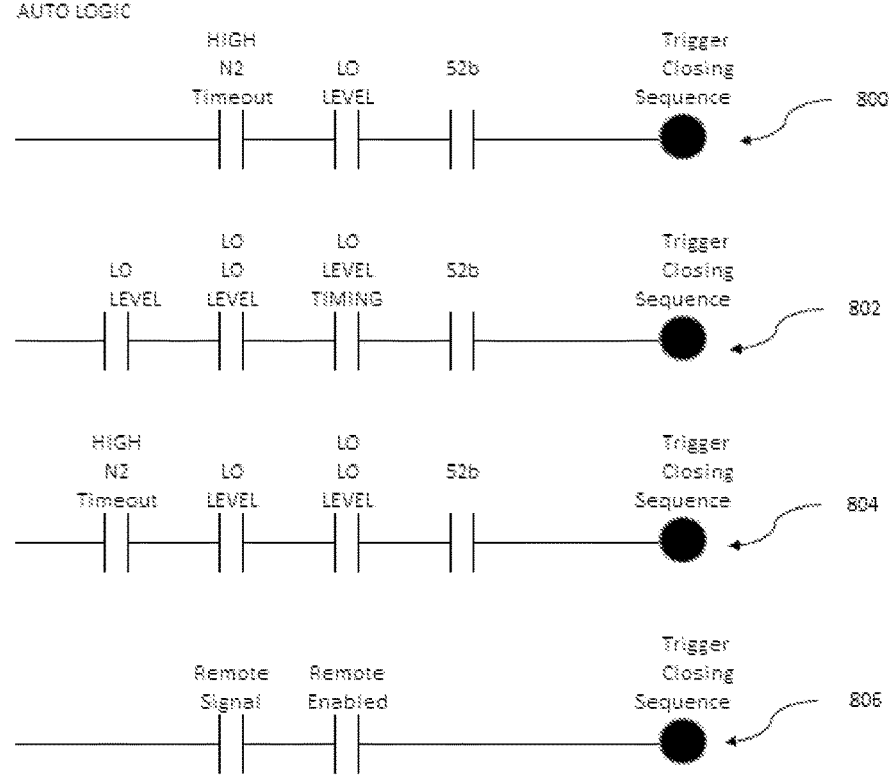
FIG. 8 is a logic timing diagram showing four Logic options for triggering an automated valve closing sequence to isolate a plurality of radiator sections.

With reference to FIG. 7B and FIG. 8, an embodiment of a valve closing sequence is shown. The primary condition for the transformer monitor 110 to trigger 722 a valve closing sequence is the first logic condition 800 shown in FIG. 8, which is the logical AND of a TRUE signal from the high N2 flow sensor 302, a TRUE signal from the Lo oil level sensor 304, and a TRUE signal from the breaker 52b sensor 306.

When the first logic condition becomes TRUE, radiator section 1 is isolated 724 by closing valves 1A and 1B 314, 312 of FIG. 3, for example.

Then, radiator section 1 limit switches are closed, or a max time out occurs 726.

Next, radiator section 2 is isolated 728 by closing valves 2A and 2B 314, 312 of FIG. 3, for example.

Then, radiator section 2 limit switches are closed, or a max time out occurs 730, 732, 734, and this process 732, 734 continues until isolation of all the radiator sections has been at least attempted.

If each section's limit switches are not yet closed, or the cycle time+five seconds has elapsed 740, then check whether ALL valves have closed 736.

If all of the valves have closed 738, then report/indicate that all valves have closed 740.

If all the valves have NOT closed 742, then report/indicate 744 that there has been a failure to close all of the valves.

By closing the valves sequentially to isolate each radiator section as shown in FIG. 7B, the possibility of overwhelming the station DC power supply (battery & charger) as each set of valves are closed is eliminated. Once the sequence of FIG. 7B is initiated, the processor 600 begins isolating 724 a first radiator section until the actuators reach their close limits 614, or until when the timer for this operation 726 has timed out. The torque control unit 618 limits torque to ensure that no valve damage occurs due to overtravel.

The open and close statuses of the actuators 312, 314 can be determined by the indicators 616 located on each actuator 312, 314, or by the display 602 integrated within the transformer monitor 110.

The substation power transformer monitoring system of the invention can be transferred from one substation power transformer to another, when the substation power transformer reaches its end of life.

With reference to FIG. 8, the supervising logic 800 executed by the processor 600 is based on the logic values received from the sensors for detecting high nitrogen (N2) flow 302, LO oil level 304, and open breaker 52b status 306. If the logical AND of these logic values is TRUE, then an automatic isolation (closing sequence of FIG. 7B) of the top valve actuators 312 and the bottom valve actuators 314 is performed. Additional isolation valve actuators 318, 320 can be added via Extended I/O 316 into the closing sequence.

Alternatively, if the substation owner selects the supervising logic 802 to be executed by the processor 600, then values received from the sensors for detecting LO oil level 304, LO LO oil level 308, and a thresholding of the time interval between the triggering of the LO oil level 304, LO LO oil level 308 sensors, and the breaker 52b status 306 will be used to trigger the closing sequence of FIG. 7B. If the logical AND of these logic values is TRUE, then the automatic isolation sequence (closing sequence of FIG. 7B) of the top valve actuators 312 and the bottom valve actuators 314 is performed.

Referring again to FIG. 8, if the substation owner is more conservative in restricting the use of this automation, a combination 804 of high nitrogen (N2) flow 302, low oil level 304, low low oil level 308, and an open breaker 52b status 306 can be used to trigger the closing sequence of FIG. 7B.

Further, the automated radiator section isolation sequence of FIG. 7B can also be initiated remotely 806 by the substation owner sending a Remote Signal to the processor 600, assuming that Remote action is Enabled. Remote action is accomplished using the physical wiring of the optional arming contacts 902 of FIG. 9, even with a closed breaker 52b status.

Figure 9:
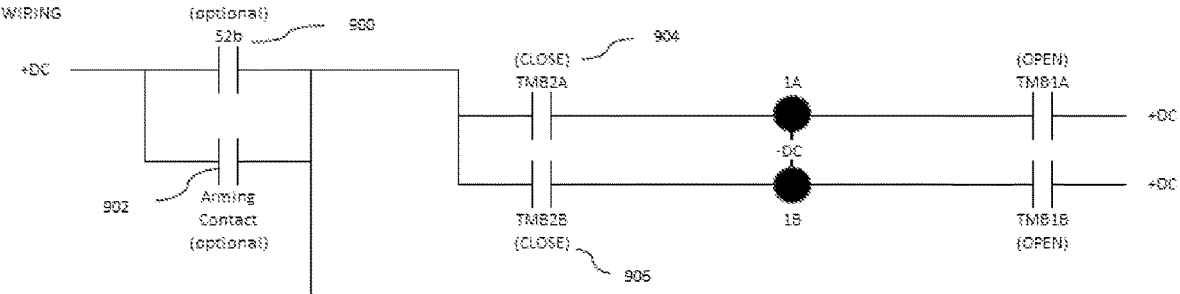
FIG. 9 is a wiring diagram showing an embodiment of output wiring for controlling two radiator sections in the monitoring system.

Referring to FIG. 9, individual radiator sections 108, 110 can be targeted for closure by the substation owner, overriding the automation of FIG. 7B. When a high nitrogen (N2) flow 302 has been detected, the substation owner can review footage from substation cameras, if available, to determine which section has been damaged. The owner can disable the automation remotely, and then activate the appropriate arming contact 902 to allow remote operation. The owner can then trigger the appropriate output contacts TMB2A and TMB2B 904, 906 thereby closing the affected radiator section.

The transformer monitor 110 provides additional features, such as capturing and time-stamping events in an event capture module 610 as they occur to share with authorities, as needed. The operation of input structure 606 and output circuits 608 are monitored, and can provide details such as "all valves closed" 738 via communication ports 604 to the substation owner. The physical arming contacts 900, 902 prevent cyberattacks that are intended to close isolation valves to initiate damage to the associated transformer. By limiting the knowledge of these arming contacts 900, 902 in drawings and labels, the owner can restrict knowledge of these arming functions to only the personnel necessary to perform these operations.

Other modifications and implementations will occur to those skilled in the art without departing from the spirit and the scope of the invention as claimed. Accordingly, the above description is not intended to limit the invention, except as indicated in the following claims.

What is claimed is:

1. A substation power transformer monitoring system comprising:

a plurality of oil level indicators configured to provide oil level signals, including lo and lo lo;

a plurality of nitrogen flow rate indicators configured to provide nitrogen flow rate signals;

a plurality of 52b breaker status indicators configured to provide 52b breaker status signals;

a plurality of valve actuator position indicators configured to provide valve actuator position signals;

a plurality of valve actuators for controlling a valve that controls oil flow out of a radiator cooling section, each valve actuator configured to respond to control signals that control valve opening and valve closure;

a transformer monitor having:

a memory;

a processor operatively coupled to the memory; and an input structure operatively coupled to the processor, the input structure configured to receive the oil level signals, the nitrogen flow rate signals, the 52b breaker status signals, and the valve actuator position signals, the processor configured to execute instructions stored in the memory using the oil level signals, the nitrogen flow rate signals, the 52b breaker status signals, and the valve actuator position signals to perform processor operations including:

using the oil level signals, the nitrogen flow rate signals, the 52b breaker status signals, and the valve actuator position signals to determine when predefined radiator section isolation conditions are met; and sending control signals to the valve actuators to close or open the valves based on the predefined radiator section isolation conditions, or based on remote manual commands so as to isolate damaged radiator sections.

2. The substation power transformer monitoring system of claim 1, wherein the processor operations further include:

immediately initiating local and remote alarms in response to the predefined radiator section isolation conditions being met, thereby locally and remotely indicating particular damaged radiator sections that require isolation.

3. The substation power transformer monitoring system of claim 1, further comprising:

a second monitor or I/O extension unit operatively coupled to the transformer monitor, the second monitor or I/O extension unit configured to allow additional radiator sections to be controlled, and whose operation is directed by the monitoring system.

4. The substation power transformer monitoring system of claim 1, further comprising:

a communication port configured to couple to a Station Remote Terminal Unit for data transfer, and configured to allow external control.

5. The substation power transformer monitoring system of claim 1, wherein the predefined radiator section isolation conditions include:

high nitrogen flow rate;

low oil level; and an open status of the 52b breaker.

6. The substation power transformer monitoring system of claim 1, wherein the predefined radiator section isolation conditions include:

dropping oil level from lo to lo lo occurring within a predetermined time period; and an open status of the 52*b* breaker.

7. The substation power transformer monitoring system of claim 1, wherein the predefined radiator section isolation conditions include:

high nitrogen flow rate;

falling oil level from lo to lo lo; and an open status of the 52*b* breaker.

8. The substation power transformer monitoring system of claim 1, further comprising:

time-stamping each performed operation and retaining each performed operation with a time-stamp for future reference.

* * * * *